United States Patent
Nishi

(10) Patent No.: US 11,073,814 B2
(45) Date of Patent: Jul. 27, 2021

(54) DATA MANAGEMENT APPARATUS, DATA MANAGEMENT METHOD, AND DATA MANAGEMENT PROGRAM

(71) Applicant: FANUC CORPORATION, Yamanashi (JP)

(72) Inventor: Hiroji Nishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/511,573

(22) Filed: Jul. 15, 2019

(65) Prior Publication Data
US 2020/0041976 A1 Feb. 6, 2020

(30) Foreign Application Priority Data
Jul. 31, 2018 (JP) .............................. JP2018-143548

(51) Int. Cl.
*G05B 19/406* (2006.01)

(52) U.S. Cl.
CPC .. *G05B 19/406* (2013.01); *G05B 2219/32366* (2013.01)

(58) Field of Classification Search
CPC .............. G05B 19/406; G05B 19/4083; G05B 19/4183; G05B 2219/31282; G05B 2219/32366; G05B 2219/35356; Y02P 90/02; G06N 20/00
See application file for complete search history.

(56) References Cited

U.S. PATENT DOCUMENTS

| | | | |
|---|---|---|---|
| 10,372,104 B2* | 8/2019 | Case | G05B 19/418 |
| 10,951,510 B2* | 3/2021 | Imai | H04L 63/101 |
| 2002/0123864 A1* | 9/2002 | Eryurek | G05B 23/0254 702/188 |
| 2015/0277429 A1* | 10/2015 | Drath | G05B 19/406 700/108 |

(Continued)

FOREIGN PATENT DOCUMENTS

| | | |
|---|---|---|
| JP | 2005-250993 | 9/2005 |
| JP | 2015-225648 | 12/2015 |

(Continued)

*Primary Examiner* — Kostas J Katsikis
(74) *Attorney, Agent, or Firm* — Wenderoth, Lind & Ponack, L.L.P.

(57) ABSTRACT

To provide a data management apparatus, a data management method, and a data management program capable of restricting the output of machine information to an external location according to the level of confidentiality of each piece of machine information. An edge server that provides machine information in a factory to an external location includes an execution unit configured to execute an application referring to a database storing the machine information, a setting unit configured to acquire lists of transmission destinations and transmission items defined for each application and set, as transmission conditions, a transmission destination and a transmission item permitted by a user from the lists, a data processing unit configured to sort out transmitted data output from the application according to the transmission conditions, and a transmission and reception unit configured to transmit the transmitted data processed to the external location.

6 Claims, 2 Drawing Sheets

| DESTINATION URL | TRANSMISSION | RECEPTION | USER ID |
|---|---|---|---|
| www.***.co.jp | ☑ | ☑ | abcd |
| 111.222.333.444:22 | ☑ | ☑ | * |
| www.***.com | ☑ | ☐ | * |

(56) References Cited

U.S. PATENT DOCUMENTS

| | | | |
|---|---|---|---|
| 2016/0252895 A1* | 9/2016 | Case | G06Q 50/04 700/12 |
| 2018/0081345 A1* | 3/2018 | Mailman | G05B 19/4183 |
| 2018/0117765 A1* | 5/2018 | Inaba | G05D 1/0223 |
| 2018/0246497 A1* | 8/2018 | Wolf | G05B 19/4183 |
| 2018/0246502 A1* | 8/2018 | Meier | G06Q 10/06 |
| 2018/0309831 A1* | 10/2018 | Sherman | H04L 67/125 |
| 2019/0240889 A1* | 8/2019 | Lettowsky | G05B 19/41865 |
| 2019/0265687 A1* | 8/2019 | Pal | G05B 19/41855 |
| 2019/0372882 A1* | 12/2019 | Imai | H04L 41/12 |
| 2020/0041976 A1* | 2/2020 | Nishi | G05B 19/406 |
| 2020/0257267 A1* | 8/2020 | Wolf | G05B 19/4068 |

FOREIGN PATENT DOCUMENTS

| | | |
|---|---|---|
| JP | 2016-192060 | 11/2016 |
| JP | 2017-27449 | 2/2017 |
| JP | 2017-084141 | 5/2017 |
| JP | 2017-199077 | 11/2017 |
| KR | 101878707 B1 * | 7/2018 |

\* cited by examiner

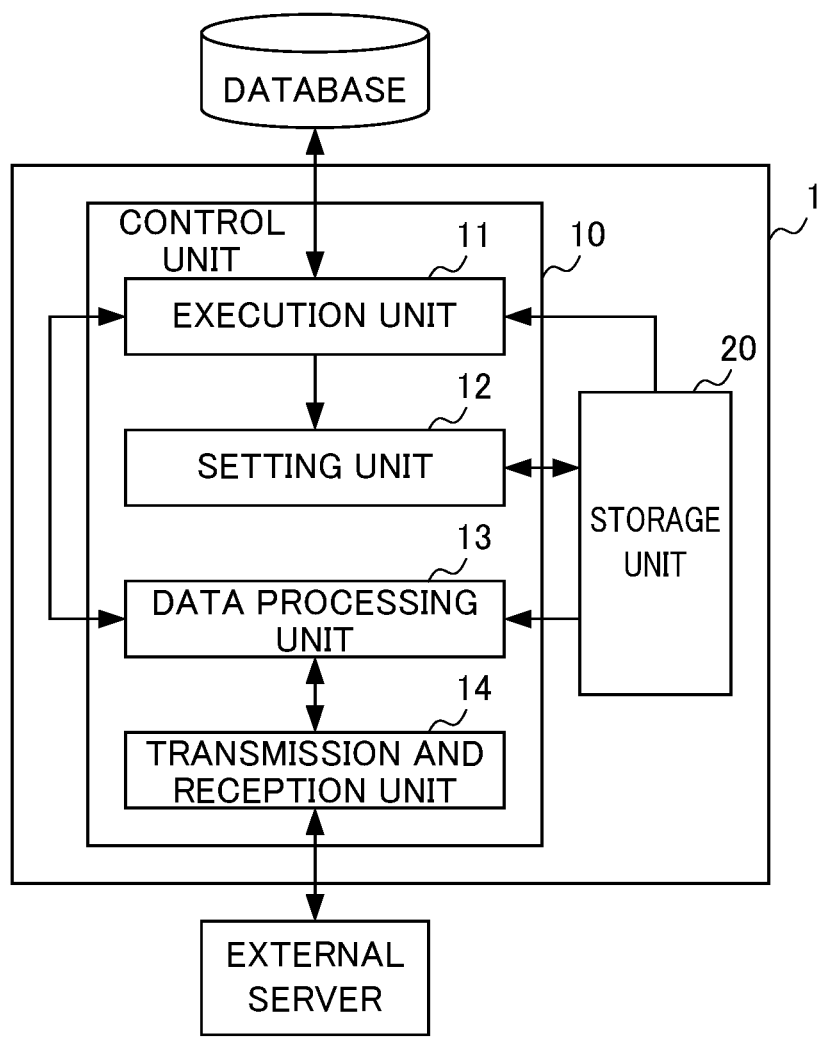

FIG. 3

| ITEM | DATA TYPE | TRANSMISSION IS PERMITTED | FILTER | REPLACEMENT EXPRESSION/ RETRIEVAL EXPRESSION |
|---|---|---|---|---|
| PRODUCT NAME | STRING | ☐ | | |
| NAME OF PRODUCTION REPRESENTATIVE | STRING | ☑ | REPLACEMENT | PERSON IN CHARGE OF LINE 1 |
| NUMBER OF PRODUCTION REPRESENTATIVE | STRING | ☑ | REPLACEMENT | SCRIPT |
| NUMBER OF ITEMS PRODUCED | NUMBER | ☐ | | |
| NAME OF PRODUCTION EQUIPMENT | STRING | ☑ | RETRIEVAL | GRINDING MACHINE 001 |
| TOOL NAME | STRING | ☑ | REJECTION | Tool * |
| MACHINING TIME | TIME | ☑ | | |

FIG. 4

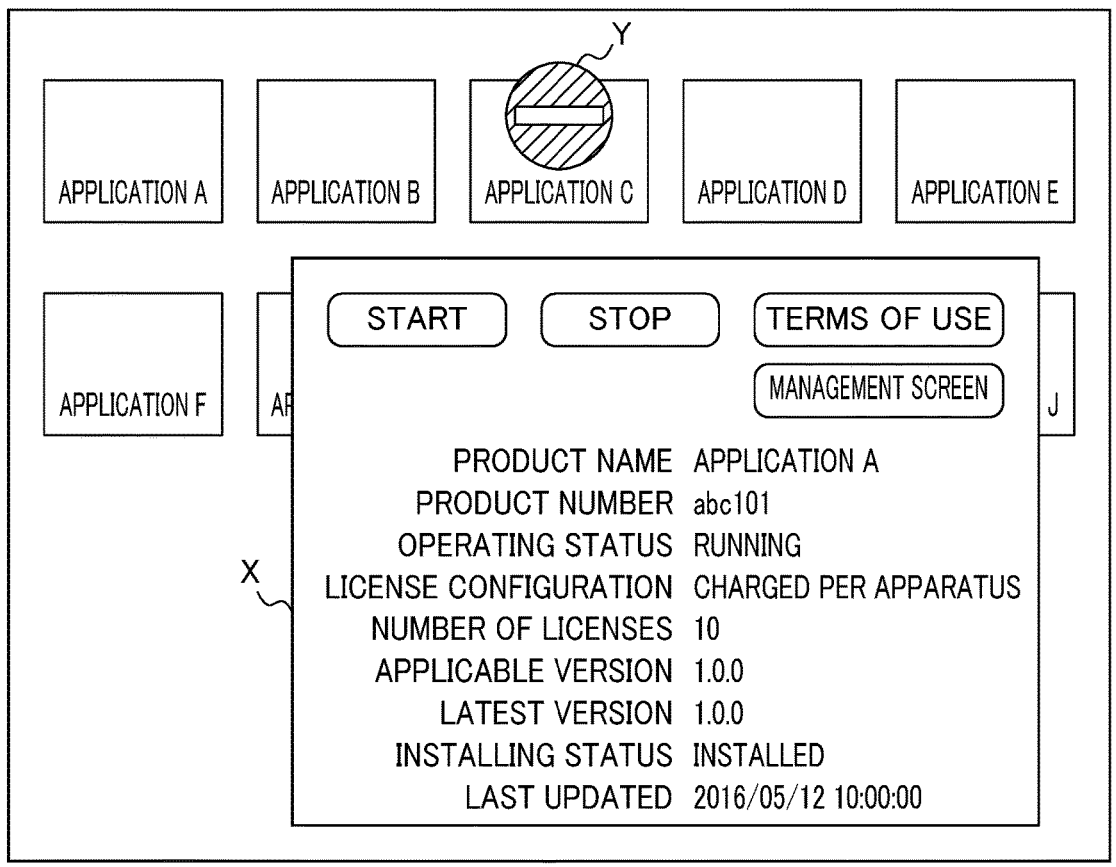

DATA MANAGEMENT APPARATUS, DATA MANAGEMENT METHOD, AND DATA MANAGEMENT PROGRAM

This application is based on and claims the benefit of priority from Japanese Patent Application No. 2018-143548, filed on 31 Jul. 2018, the content of which is incorporated herein by reference.

BACKGROUND OF THE INVENTION

Field of the Invention

The present invention relates to an apparatus, a method, and a program for managing data regarding machines in a factory and providing the data to a location external to the factory.

Related Art

Conventionally, the production efficiency, quality improvement, etc. in a factory have been undertaken by collecting information from manufacturing machines such as machine tools, robots, and computerized numerical controllers (CNCs) in the factory and analyzing the information in a cloud server (for example, refer to Patent Documents 1 to 3). The collected information includes, for example, operation information indicating the operating rate of the machine, information on the maintenance history of the machine, information on the degradation state of a mechanical unit and an electronic part, information on the history of alarms generated in the machine, information on changes in accuracy and takt time, information on the change histories of programs and set values used in manufacture, and information on the histories of changes in ambient temperature and humidity. The information is also effectively used in the maintenance of the machine. Hereinafter, such information is referred to as machine information.

If an information acquisition command is issued from the cloud server to each machine, each machine transmits machine information to the cloud server, and the information is analyzed in the cloud server. An information acquisition command may be issued from a cloud server every time prior to transmitting machine information, or once an information acquisition command is issued, machine information may be continuously transferred in chronological order in accordance with the command. Furthermore, instead of accepting an information acquisition command from a cloud server, an information acquisition command is preset in each machine, and machine information may be continuously transmitted in accordance with this setting.

Patent Document 1: Japanese Unexamined Patent Application, Publication No. 2017-199077
Patent Document 2: Japanese unexamined Patent Application, Publication No. 2017-027449
Patent Document 3: Japanese Unexamined Patent Application, Publication No. 2015-225648

SUMMARY OF THE INVENTION

By analyzing machine information collected in a cloud server, it is possible to grasp, for example, how much manufacturing capability each machine has. In addition, by knowing the manufacturing capability of each machine, it is possible to grasp how many products a factory produced. Furthermore, by knowing the manufacturing capability of the factory, it is possible to grasp the sales of a company that operates the factory. As described above, machine information may be highly confidential information for a company, and leakage of machine information transmitted to a cloud server may affect the management of a company. For this reason, it may not be permitted to place machine information on a cloud server. As a result, the data analysis function provided by a cloud server has not been fully utilized.

For example, machine information may include information related to the designing of a machine by analyzing the machine information with a maintenance application located on a cloud server, even for the purpose of identifying a cause of failure and restoring the machine at a remote location when the machine breaks down. In such a case, it has been avoided to disclose the machine information to anyone other than the maintenance workers of a manufacturer who developed and manufactured the machine.

It is an object of the present invention to provide a data management apparatus, a data management method, and a data management program capable of restricting the output of machine information to a location external to the factory according to the level of confidentiality of each piece of machine information.

(1) The data management apparatus (e.g., an edge server 1 described later) according to the present invention is a data management apparatus for providing machine information in a factory to a location external to the factory, and includes an execution unit (e.g., an execution unit 11 described later) configured to execute an application referring to a database storing the machine information; a setting unit (e.g., a setting unit 12 described later) configured to acquire lists of transmission destinations and transmission items defined for each application from the execution unit, and set, as transmission conditions, a transmission destination and a transmission item permitted by a user from the lists; a data processing unit (e.g., a data processing unit 13 described later) configured to sort out transmitted data output from the application according to the transmission conditions; and a transmission unit (e.g., a transmission and reception unit 14 described later) configured to transmit the transmitted data processed by the data processing unit to the location external to the factory.

(2) In the data management apparatus described in (1), the setting unit further sets a filtering condition for sorting out or replacing the transmitted data for each transmission item, and the data processing unit further sorts out or replaces the transmitted data sorted out by the transmission conditions, according to the filtering condition.

(3) In the data management apparatus described in (2), the filtering condition may include a replacement condition that masks at least a section of a string of the transmitted data.

(4) In the data management apparatus described in any one of (1) to (3), the data processing unit may store a history of the transmitted data that is transmitted to the location external to the factory.

(5) A data management method according to the present invention is a data management method for providing machine information in a factory to a location external to the factory, in which a computer (e.g., an edge server 1 described later) executes: an execution step of executing an application referring to a database storing the machine information; a setting step of acquiring lists of transmission destinations and transmission items defined for each application, and setting, as transmission conditions, transmission destinations and transmission items permitted by a user from the lists; a data processing step of sorting out transmitted data output from the application according to the transmission conditions; and a transmission step of transmitting the transmitted data processed in the data processing step to the location external to the factory.

(6) A data management program according to the present invention is a data management program for providing machine information in a factory to a location external to the factory and for making a computer (e.g., an edge server 1 described later) execute: an execution step of executing an application referring to a database storing the machine information; a setting step of acquiring lists of transmission destinations and transmission items defined for each application, and setting, as transmission conditions, transmission destinations and transmission items permitted by a user from the lists; a data processing step of sorting out transmitted data output from the application according to the transmission conditions; and a transmission step of transmitting the transmitted data processed in the data processing step to the location external to the factory.

According to the present invention, the output of machine information to a location external to the factory is restricted according to the level of confidentiality of each piece of machine information.

BRIEF DESCRIPTION OF THE DRAWINGS

FIG. 1 is a block diagram illustrating the functional configuration of an edge server according to an embodiment;

FIG. 2 is a diagram illustrating an example of a list of transmission and reception destinations prepared by a setting unit according to the embodiment;

FIG. 3 is a diagram illustrating an example of a transmission items list prepared by a setting unit according to the embodiment; and FIG. 4 is a diagram illustrating an example of a list screen of the applications according to the embodiment.

DETAILED DESCRIPTION OF THE INVENTION

An embodiment of the present invention will be described below. FIG. 1 is a block diagram illustrating the functional configuration of an edge server 1 (data management apparatus) according to the present embodiment. The edge server 1 is an information processing apparatus (computer) for connecting a network in a factory and an external server such as a cloud server.

In the present embodiment, the factory is not limited to a manufacturing facility of products, parts, or the like, and includes a facility that conducts research and development, and the like. The edge server 1 manages whether or not machine information stored in a local network of such a factory can be provided to a location external to the factory. Note that the edge server 1 may be installed in the factory but not limited thereto.

The ranking of the machine information is set according to a level of confidentiality and is saved in a database. An external server cannot directly obtain the machine information from the database. The highly confidential machine information saved in the database can be processed only by an application running on the edge server 1. That is, when the machine information is provided to the external server, transmission processing is performed via the application.

The edge server 1 includes a control unit 10 and a storage unit 20. The control unit 10 includes an execution unit 11, a setting unit 12, a data processing unit 13, and a transmission and reception unit 14. The control unit 10 reads and executes a data management program stored in the storage unit 20 to function as each of these units.

The execution unit 11 executes an application referring to the database storing the machine information in the factory. Various applications in addition to the data management program are installed in the storage unit 20. When these applications are executed by the execution unit 11, they refer to the database provided in an apparatus inside or outside the edge server 1, and request communication with the external server.

The setting unit 12 acquires, from the execution unit 11, a list of transmission or reception destinations and an items list indicating the type of each piece of information that is transmitted or received, defined for each application. The setting unit 12 sets, as transmission or reception conditions, a transmission or reception destination and a transmission or reception item permitted by a user (administrator) from the acquired lists. In addition, even in items where transmission or reception is permitted, the setting unit 12 further sets a filtering condition for sorting out or replacing data where transmission or reception is permitted based on the actual detailed contents of the transmitted or received data for each of the items.

FIG. 2 is a diagram illustrating an example of a list of transmission and reception destinations prepared by the setting unit 12 according to the present embodiment. The list of transmission and reception destinations snows a URL of a transmission or reception destination, and which of transmission and reception is performed, or that both transmission and reception are performed, for each application. Furthermore, a user ID for executing transmission or reception may be specified for each destination URL.

In this example, the check box of transmission is checked if transmission is performed, and the check box of reception is checked if reception is performed, with respect to the destination URL. The settings of transmission and reception indicated by these check boxes can be changed in the management screen of the edge server 1 or a terminal device connected to the edge server 1, and the user unchecks a check box of a destination in which transmission or reception is not permitted.

FIG. 3 is a diagram illustrating an example of a transmission items list for each application, prepared by the setting unit 12 according to the present embodiment. The transmission items list describes items being the type of information to be transmitted by the application such as product name, the name of production representative, and the number of items produced, and further describes, for each of the items, the data type such as string or number, and whether or not transmission is permitted.

In this example, the check box is checked if transmission is permitted, for each item. The settings as to whether transmission is permitted, indicated by these check boxes, can be changed in the management screen, and the user unchecks the check box for an item where transmission is not permitted.

Furthermore, when a filtering condition for sorting out or replacing the actual transmitted data classified into each item is input from the management screen, it is registered in the transmission items list. In this example, as the specific type of a filtering condition, retrieval or rejection for sorting out, or replacement is selected. If retrieval is selected, transmission is permitted for transmitted data that matches a specified retrieval expression such as "grinding machine 001". If rejection is selected, transmission is not permitted for transmitted data that matches a specified retrieval expression such as "Tool *" (* is a wild card). If replacement is selected, transmitted data is processed according to a specified replacement expression.

As for the replacement expression, a script for masking at least a section of a string by using a regular expression, or the like may be specified, in addition to replacement expressions for converting a string to a fixed string such as "person in charge of line 1". For example, with the script "s/[0-9] [0-9] [0-9] [0-9] [0-9]/00\3\4\5/g", the upper two digits of the production representative number "56789" are masked and replaced with "00789".

An example of the transmission items list is illustrated here. Also, as for the reception items list, items, the data type, and reception permission and filtering conditions for sorting out or replacing received data that can be provided to the application may be specified for each application.

The setting unit 12 receives, as a set, the initial setting information of the list of transmission and reception destinations, the transmission items list, and the reception items list from, each application. If there is a destination that differs in the conditions of transmission or reception, the setting unit 12 receives a plurality of sets, and with respect to each set, sets permission and a filtering condition for each destination and each item.

The data processing unit 13 determines the items of transmitted data output from the application and received data received by the transmission and reception unit 14, and sorts out items according to transmission conditions or reception conditions, i.e., sorts out only the items in which transmission/reception is permitted in the transmission/reception items list. Furthermore, the data processing unit 13 further sorts out or replaces transmitted data or received data sorted out according to transmission conditions or reception conditions, according to filtering conditions.

In addition, the data processing unit 13 stores the history of transmitted data that was transmitted to a location external to the factory and the history of received data that was received from a location external to the factory and provided to the application, in the storage unit 20 so that the user can refer to them.

The transmission and reception unit 14 transmits transmitted data sorted out by the data processing unit 13 to the external server. The transmission and reception unit 14 receives data from the external server and provides the data to the application through the data processing unit 13.

FIG. 4 is a diagram illustrating an example of a list screen of the applications according to the present embodiment. The information on the applications installed in the edge server 1 is displayed on a list screen of the edge server 1 or a terminal device connected to the edge server 1.

Application icons are displayed in the list screen. When the user selects one of these icons, a screen X of the detailed information on the appropriate application is displayed. The detailed information includes, for example, the name of an application (product name), an operating status such as running or stopped, license information, and version. In addition, various buttons such as start, stop, terms of use, and management screen are arranged in the screen X of the detailed information.

The contents displayed by the terms of use button may include information on transmitted and received data and transmission and reception destinations that are preset as the specifications of the application. The information corresponds to the initial setting information of the list of transmission and reception destinations, the transmission items list, and the reception items list above. Such terms of use are also displayed in the same manner at the time of installing the application. The user executes the application by agreeing to the terms of use.

After the application is executed, the user can stop the application with the stop button and resume with the start button. For example, by referring to the transmission/reception history for each application, if the user finds a data transmission record that does not match the transmission conditions and the filtering conditions because there is an irregularity in the application, the user can stop or uninstall the appropriate application. The stopped application (for example, the application C) may be distinguished from the applications being activated by displaying in gray, displaying the mark Y, or the like in the list screen.

The management screen for setting the list of transmission and reception destinations, the transmission items list, and the reception items list is displayed by the management screen button. Thus, the user can change the transmission and reception conditions and the filtering conditions as needed.

According to the present embodiment, the edge server 1 acquires the lists of destinations and items of transmission and reception defined for each application to be executed, sorts out only the destination and item permitted by the user from the list, and transmits/receives data to/from the external server. Therefore, when the application transmits machine information to an external server, the edge server 1 sorts out only the machine information of the item in which permission is set and transmits the information only to the transmission destination in which permission is set. That is, with respect to the machine information or the transmission destination in which permission is not set, the edge server 1 does not transmit the machine information to the external server even if the application outputs the machine information.

Thus, the edge server 1 can restrict the output of machine information to a location external to the factory according to the level of confidentiality of each piece of machine information by sorting out the machine information that can be transmitted for each application. In addition, the edge server 1 limits the external server being the transmission destination for each application and transmits data to only the external server having high confidentiality, thereby suppressing the leakage of confidential information from the external server.

Machine information can be analyzed in an external server such as a cloud server, while the confidentiality of the machine information is maintained by operating the edge server 1. As a result, the machine information that could not be analyzed can be analyzed, and the efficient use of the machine is promoted; thus, the productivity of the factory is improved. In addition, by enabling remote maintenance of a machine while suppressing the leakage of machine information, rapid recovery can be expected when a failure occurs in a machine in a remote location.

Furthermore, the edge server 1 can appropriately restrict the information to be transferred to the application by sorting out received data according to the destination and the item for each application, similarly to transmitted data.

The edge server 1 further sorts out or replaces transmitted data according to a filtering condition set for each application and each transmission item. Therefore, the edge server 1 processes each data of machine information with a filtering condition for each application, and thereby can transmit the machine information with reduced confidentiality to an external server. The filtering condition includes a replacement condition that masks at least a section of a string, and the edge server 1 can reduce confidentiality by easily generalizing transmitted data according to the item.

The edge server 1 can also provide received data to the application after processing the received data with a filtering condition for each application, similarly to transmitted data.

The edge server 1 stores the history of transmitted data transmitted to a location external to the factory and the history of received data received from a location external to the factory and provided to the application. Therefore, if a malicious application falsely reports a transmission/reception items list or a list of transmission and reception destinations, for example, if it attempts to transmit highly confidential information by falsifying an item, the user can refer to the transmitted/received data history and detect that data, which differs from the contents in which permission is set for each application, is transmitted/received. Such a check may be performed at an early stage of using the application but may be performed thereafter as a random inspection. If it is felt that the application is malicious, the user can stop the execution of the application or uninstall the application from the edge server 1.

As mentioned above, an embodiment of the present invention was described, but the present invention is not limited to the embodiment. Also, the effects described in the present embodiment are merely the most preferable effects resulting from the present invention, and the effects of the present invention are not limited to those described in the present embodiment.

In the present embodiment, retrieval, rejection, and replacement are illustrated as examples of the filtering-condition, and masking a section of a string is illustrated as an example of the replacement method, but the replacement method is not limited to this. Various methods of decreasing confidentiality are applicable, for example, masking a specific machine name to make a tentative name, converting a production quantity to an achievement rate, and extracting only short-term data.

The data management method by the edge server 1 is realized by software. If it is realized by software, programs constituting the software are installed into a computer. These programs may be stored in a removable medium to be distributed to a user or may be downloaded to a user's computer over a network to be distributed to the user.

EXPLANATION OF REFERENCE NUMERALS

1 EDGE SERVER
10 CONTROL UNIT
11 EXECUTION UNIT
12 SETTING UNIT
13 DATA PROCESSING UNIT
14 TRANSMISSION AND RECEPTION UNIT
20 STORAGE UNIT

What is claimed is:

1. A data management apparatus for providing machine information in a factory to a location external to the factory, the data management apparatus comprising a computer configured to:
   execute an application referring to a database storing the machine information;
   acquire a list including transmission destinations and transmission items of the machine information defined for the executed application,
   set, as a transmission condition for data output from the executed application, a transmission destination and a transmission item permitted by a user of the data management apparatus from among the transmission destinations and transmission items included in list;
   prior to transmitting the data output from the executed application to any of the transmission destinations included in the list, sort out the data output from the executed application according to the set transmission destination and the set transmission item permitted by the user of the data management apparatus; and
   transmit, from among the data output from the executed application, only the sorted out data output from the executed application to the set transmission destination permitted by the user of the data management apparatus.

2. The data management apparatus according to claim 1, wherein
   the computer is configured to set a filtering condition for sorting out or replacing the data output from the executed application, and
   prior to transmitting the data output from the executed application to any of the transmission destinations included in the list, the computer is configured to further sort out or replace the sorted out data output from the executed application according to the filtering condition.

3. The data management apparatus according to claim 2, wherein
   the filtering condition comprises a replacement condition that masks at least a section of a string of the sorted out data output from the executed application.

4. The data management apparatus according to claim 1, wherein
   the computer is configured to store a history of the sorted out data output from the executed application that is transmitted to the set transmission destination permitted by the user of the data management apparatus.

5. A data management method for providing machine information in a factory to a location external to the factory, the data management method comprising:
   executing an application referring to a database storing the machine information;
   acquiring a list including transmission destinations and transmission items of the machine information defined for the executed application;
   setting, as a transmission condition for data output from the executed application, a transmission destination and a transmission item permitted by a user of a data management apparatus from among the transmission destinations and transmission items included in the list;
   prior to transmitting the data output from the executed application to any of the transmission destinations included in the list, sorting out the data output from the executed application according to the set transmission destination and the set transmission item permitted by the user of the data management apparatus; and
   transmitting, from among the data output from the executed application, only the sorted out data output from the executed application to the set transmission destination permitted by the user of the data management apparatus.

6. A non-transitory computer-readable medium for storing a data management program for providing machine information in a factory to a location external to the factory, wherein the data management program causes a computer to perform:
   executing an application referring to a database storing the machine information;
   acquiring a list including transmission destinations and transmission items of the machine information defined for the executed application;

setting, as a transmission condition for data output from the executed application, a transmission destination and a transmission item permitted by a user of a data management apparatus from among the transmission destinations and the transmission items included in the list;

prior to transmitting the data output from the executed application to any of the transmission destinations included in the list, sorting out the data output from the executed application according to the set transmission destination and the set transmission item permitted by the user of the data management apparatus; and transmitting, from among the data output from the executed application, only the sorted out data output from the executed application to the set transmission destination permitted by the user of the data management apparatus.

* * * * *